March 16, 1926.

J. H. BEERY 1,577,100

MOLDING APPARATUS

Filed Dec. 26, 1924      3 Sheets-Sheet 1

Inventor
John H. Beery

By

Attorneys

March 16, 1926. 1,577,100
J. H. BEERY
MOLDING APPARATUS
Filed Dec. 26, 1924 3 Sheets-Sheet 2
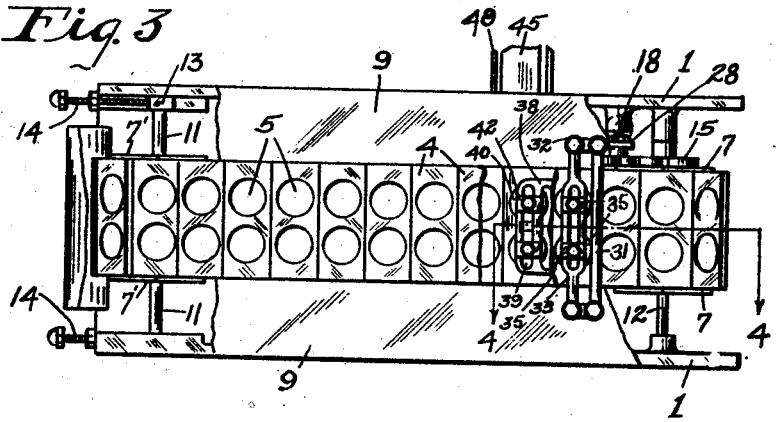
Fig. 3
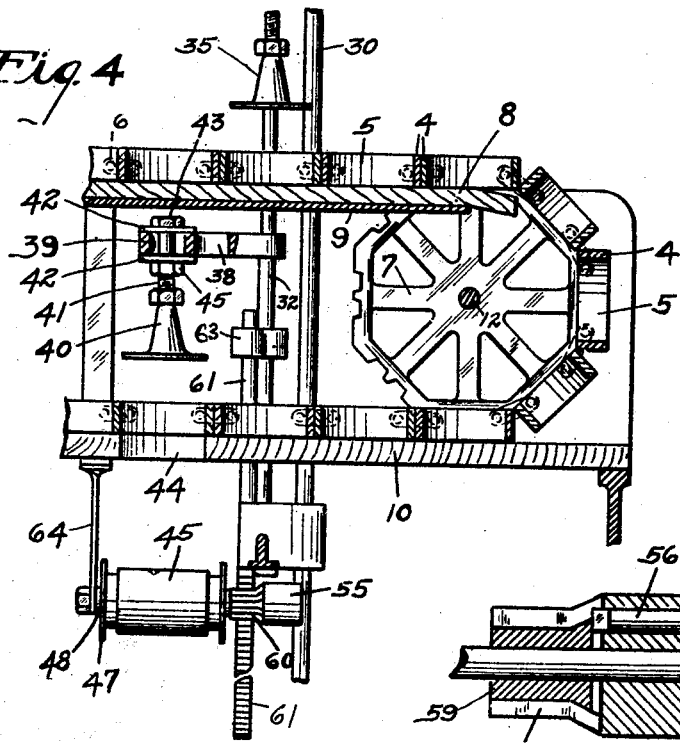
Fig. 4
Fig. 5
Fig. 6
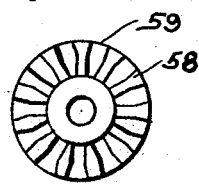
Inventor
John H. Beery
By
Attorneys March 16, 1926.

J. H. BEERY 1,577,100

MOLDING APPARATUS

Filed Dec. 26, 1924

Patented Mar. 16, 1926.

1,577,100

UNITED STATES PATENT OFFICE.

JOHN H. BEERY, OF SPRINGFIELD, OHIO, ASSIGNOR TO THE BOLMER MANUFACTURING COMPANY, OF SPRINGFIELD, OHIO, A CORPORATION OF OHIO.

MOLDING APPARATUS.

Application filed December 26, 1924. Serial No. 758,040.

*To all whom it may concern:*

Be it known that I, JOHN H. BEERY, a citizen of the United States, residing at Springfield, in the county of Clark and State of Ohio, have invented certain new and useful Improvements in Molding Apparatus, of which the following is a specification.

This invention relates to improvements in molding apparatus, it relating more particularly to apparatus for molding pop corn mixed with syrup into cakes commonly known as fritters.

An object of the invention is to improve the construction and make more effective the operation of the molding apparatus shown and described in my prior Patent No. 1,137,377 dated April 27, 1915.

A further and more specific object of the invention is to improve the devices for imparting an intermittent feed to the endless chain of molds shown in that patent whereby the molds are fed with a more positive and effective action and the devices for accomplishing the feed are simplified to effect a more economical construction.

A further and more specific object is to simplify the construction and arrangement of the ejectors shown in my former patent; also to adapt the ejectors to cooperate with a conveyor to convey the molded articles to a suitable point of discharge.

A further object of the invention is to provide an improved conveying apparatus for the molded articles for the purpose of receiving the same from the ejecting mechanism and conveying them to a suitable point of discharge.

A further object of the invention is to improve generally the arrangement and construction of my former machine.

In the accompanying drawings:

Fig. 3 is a top plan view of the machine with a portion of the molds and upper table support broken away.

Fig. 4 is a section on the line 4—4 of Fig. 3.

Fig. 5 is a detail of a part of the conveying mechanism.

Fig. 6 is another detail of the conveying mechanism.

Figure 2:
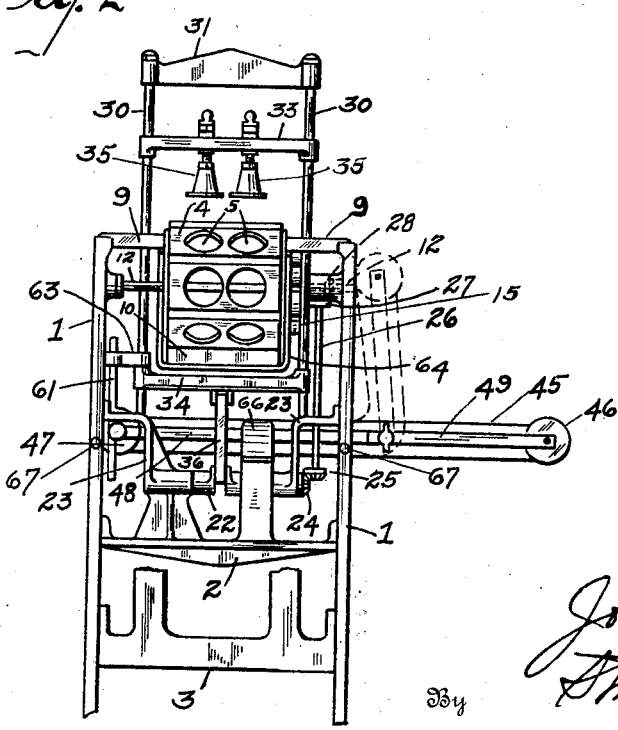
Fig 2 is an end view of the same.

Referring to the drawings, 1 represents side frame members which are suitably connected by cross frame members, two of which, 2 and 3, are shown in Fig. 2, so as to form a rigid supporting frame for the operating parts. The molding apparatus employed in this machine is substantially like that shown in my former patent and consists of a series of mold sections 4 each having a pair of mold chambers 5, the sections being flexibly connected together by links, shown in dotted lines at 6 in Fig. 4. This endless chain of molds is carried at each end by a pair of supporting wheels 7 and 7', each wheel being provided with a periphery which is polygonal in form, the form being octagonal in the present case, as described in my former patent. To support the upper portion of this endless series of mold sections there is provided, as in the case of my former patent, a table 8 supported in the depressed portion of a U-shaped cover 9, the top of the machine at the sides of the mold sections being preferably enclosed with said covering strips 9. In addition to the table 8 there is in the present case provided a second table 10 for the lower portion of the endless series of molds hereinafter referred to.

Figure 7:
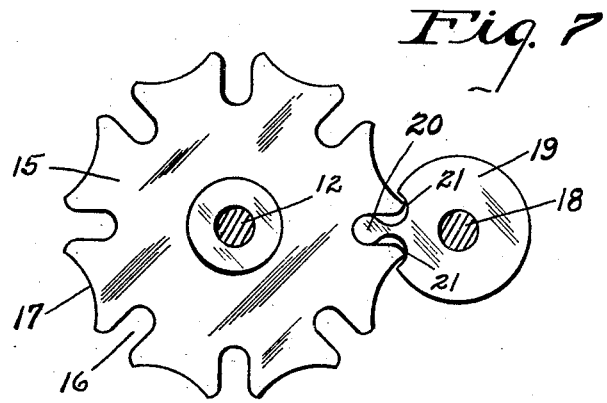
Fig. 7 is a detail of a portion of the intermittent feeding devices for the molds.

The supporting wheels 7' and 7 are secured to shafts 11 and 12. The shaft 11 is journaled in blocks 13 which are adjustable longitudinally by the screws 14 so as to adjust the tautness of mold sections. The shaft 12 is journaled in suitable bearings in the side frame members 1 and is intermittently driven to impart an intermittent movement to the molds in the following manner: Secured to the shaft 12 is a disk 15 (see Fig. 7 for detail). This disk is provided with a series of equally-spaced radial notches or recesses 16, eight in number in the present case, and between these notches the periphery is formed with concave faces 17. Journaled in suitable bearings carried by one of the side frame members 1 is a short shaft 18 the inner end of which carries a disk 19 (Fig. 7 for detail) having a single projecting tooth 20 formed with a narrow base and ball shape top as shown in the detail view. The periphery of the disk 19 at the respective sides of the tooth are formed with circular recesses 21 as shown. The tooth of the disk 19 engages with the recesses or notches of the disk 15 to drive the same with an intermittent movement while the periphery of the disk 19 coacts with the concave surfaces 17 of the disk 15 to lock the disk against rotation between each intermittent movement of the same, because of the fact that when the tooth 20 leaves any one of the notches 16 the periphery of the disk 19 and the succeeding concave surface 17 come in concentric relation until the tooth 20 engages the next succeeding notch 16, which relation of the parts acts to lock the disk 15 against rotation.

The short shaft 12 is continuously driven from a main driving shaft 22 which is journaled in bearings carried by brackets 23. This shaft 22 has a bevelled gear 24 meshing with another bevelled gear 25 on the lower end of a vertical shaft 26. The upper end of this shaft 26 carries a bevelled gear 27 meshing with a bevelled gear 28 secured to the short shaft 12. The crank shaft 22 is driven from an electric motor 29, the shaft (not shown) of which extends into the housing 66 containing gear reducing mechanism of any common type, the main drive shaft 22 being extended through this housing and driven by the reducing gears therein.

The mechanism for compressing the material in the molds is the same as that shown and described in my former patent. A pair of guide rods or standards 30 are suitably supported by the frame at their lower ends and connected together at the top by a cross bar 31. A reciprocating frame consisting of a pair of vertical rods 32 connected by a pair of cross rods 33 and 34 is slidably mounted upon these guide rods 30, this frame carrying at its upper end the presser plungers 35 which are adjustably supported by the cross bar 33, which is slotted as shown in Fig. 3. The frame is reciprocated through a pitman 36 one end of which is connected to the cross bar 34 and the other end to a crank 37 on the shaft 22. The parts are so timed that during each intermittent period of rest of the molds the reciprocating frame is drawn downwardly so as to compress the material in the molded sections which are immediately beneath the plungers 35 and then partially retracted so as to free the plungers from the molding chambers before the next intermittent movement of the molds takes place.

In the present machine I have dispensed with the more or less complicated ejecting mechanism of my prior patent and connect the ejectors directly with the reciprocating frame so that as the reciprocating frame descends to compress the material in the molds the finished molded articles are ejected. To that end I connect to the rods 32 between the floors 8 and 10 a head 38 provided with a transversely-arranged slot 39 (Figs. 3 and 4) on which are adjustably mounted a pair of ejectors 40. Each ejector has a threaded stem 41 which projects through a pair of plates 42 located respectively below and above the slotted portion of the head 38 and the head, plates and stem are clamped together by the nuts 43; this arrangement permitting lateral adjustment of the ejectors. These ejector plungers stand in line with openings 44 in the floor 10 and as the filled molded sections pass over these openings the molded articles are ejected through the openings upon each intermittent operation of the reciprocating frame.

Figure 1:
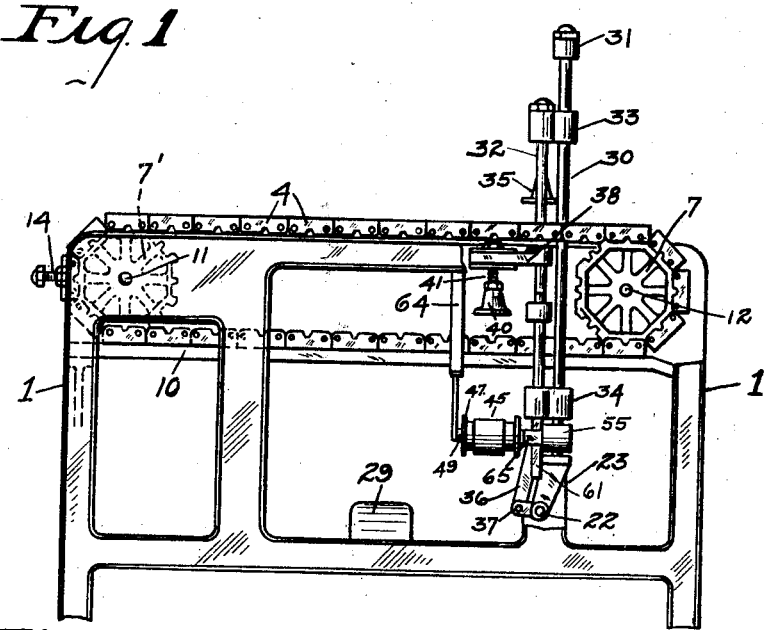
Fig. 1 is a side elevation of a machine embodying the improvements with a portion of the side frame broken away.
Figure 8:
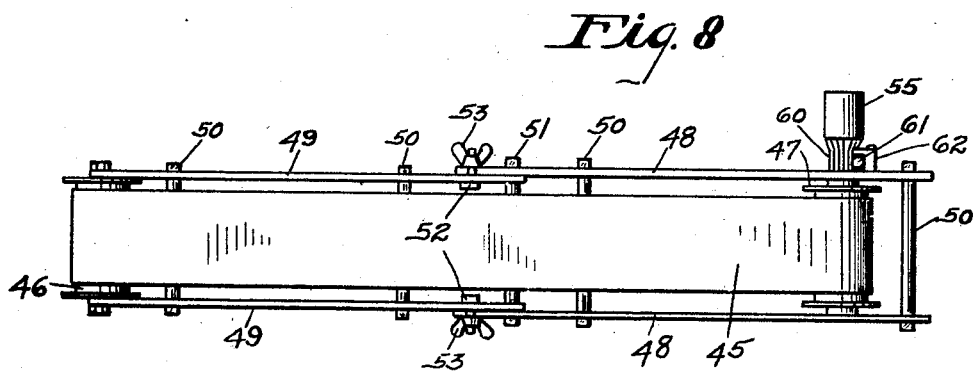
Fig. 8 is a top plan view of the conveyor.

The molded articles after being ejected are deposited upon the inner end of an endless belt carrier 45 which passes over drums 46 and 47 rotatably mounted in a frame consisting of side members 48 and 49 connected by a series of cross rods 50 and 51. Each of the side members 48 and 49 is pivotally mounted upon the cross rod indicated by 51, with their ends overlapping and locked together by bolts 52 having wing nuts 53. The shaft 54 of the drum 47 has connected with one end thereof a collar 55 carrying a pawl 56 impelled by a spring 57 into engagement with teeth 58 on the end of a ratchet wheel 59 (Figs. 5 and 6 for detail). The periphery of the ratchet wheel has a series of teeth 60 engaged by a rack bar 61 held to the ratchet wheel by a keeper 62, (Fig. 8) this rack bar 61 being connected by a clamp 63 to one of the rods 32 of the reciprocating frame. One end of the carrier frame is supported by a hanger 64, suspended from the main frame, (Fig. 1) which is secured in any suitable way to the end of one of the cross rods 50, and also by a bracket 65 which is bolted to one of the side frames 48 and to the main frame of the machine. The central portion of the carrier frame is also secured to the side frame members by bolts or screws two of which are indicated at 67 in Fig. 2. Upon each descent of the reciprocating frame the shaft of the roll 47 is revolved so as to impart a partial feeding movement to the carrier belt 45, the ratchet wheel 59 ratcheting over the pawl 56 upon the return movement of the reciprocating frame. When not in use, the thumb nuts 53 may be loosened and the outer end of the carrier frame tilted to the dotted line position shown in Fig. 2.

The operation is as follows: The endless series of mold sections are given an intermittent movement from the main driving shaft through the connections described, including the disks 15 and 19, and a reciprocating movement is imparted to the frame which carries the presser plungers, ejector plungers and rack which operates the conveyor. The operating parts are so timed that during each intermittent period of rest of the molds the reciprocating frame descends so as to compress the material in the molds above the upper floor section 8 and to eject the molded articles from the molds upon the lower floor section 10. The ejected articles fall upon the endless belt 45 and are conveyed thereby to a suitable point of discharge.

While as before stated the machine is one particularly adapted for the manufacture of pop corn fritters, yet it is obvious that the constructions are applicable to the molding of other granular materials.

Having thus described my invention, I claim:

1. In a machine of the character described, a series of intermittently travelling molds, a frame together with means for reciprocating the same across the line of travel of said molds, a presser plunger carried by said frame, and an ejector plunger carried by said frame for ejecting the molded articles from said molds.

2. In a machine of the character described, an endless series of intermittently travelling molds, a frame together with means for reciprocating the same across the line of travel of said molds, an upper and lower table forming supports for said molds, a presser plunger carried by said reciprocating frame and cooperating with the upper table to press the material into said molds, said lower table being formed with an opening, and an ejector plunger carried by said frame in line with said opening for ejecting the molded articles from said molds.

3. In a machine of the character described, an endless series of intermittently travelling molds, a pair of guide standards, a frame consisting of side rods and cross rods slidably mounted upon said guide standards, means for reciprocating said frame, a presser plunger carried by said frame for pressing the material into said molds, a table forming a support for the lower portion of the travelling molds, said table having an opening, a supporting head secured to said frame, and an ejector plunger adjustably secured to said head and arranged in line with said opening to eject the molded articles from said molds.

4. In a machine of the character described, an endless series of molds together with means for imparting an intermittent travel to said molds, a frame together with means for reciprocating said frame across the line of travel of said molds, a presser plunger carried by said frame for pressing the material into said molds, and an ejector plunger carried by said frame for ejecting the molded articles from said molds, a conveyor for said articles and means operated from said frame for imparting an intermittent movement to said conveyor.

5. In a machine of the character described, an endless series of molds together with means for imparting an intermittent travel thereto, a frame together with means for reciprocating said frame across the line of travel of said molds, an upper and lower table forming supports for said molds, a presser plunger carried by said reciprocating frame and cooperating with the upper table to press the material into said molds, said lower table having an opening, and an ejector plunger carried by said reciprocating frame in line with said opening for ejecting molded articles from said molds through said opening, an endless conveyor having one end arranged in line with said opening to receive the ejected articles, and means carried by said frame for intermittently moving said conveyor.

6. In a machine of the character described, devices for molding and ejecting articles, an endless belt having one end arranged to receive the ejected articles, drums about which said belt passes, pawl and ratchet mechanism associated with one of said drums, and a rack operated simultaneously with said molding and ejecting devices for operating said ratchet wheel.

7. In a machine of the character described, devices for molding and ejecting articles comprising a reciprocating member carrying presser and ejecting devices, an endless carrier having one end arranged to receive the ejected articles, and means operated from said reciprocating member for imparting an intermittent motion to said carrier.

In testimony whereof, I have hereunto set my hand this 22nd day of December, 1924.

JOHN H. BEERY.